United States Patent [19]  
Marsh

[11] 4,054,404  
[45] Oct. 18, 1977

[54] ROTATING DOCTOR BLADE

[75] Inventor: Mose Jackson Marsh, Chickamauga, Ga.

[73] Assignee: Standard Brands Incorporated, New York, N.Y.

[21] Appl. No.: 693,734

[22] Filed: June 7, 1976

[51] Int. Cl.² .................. A21C 11/00; A21C 15/02
[52] U.S. Cl. .................................. 425/231; 15/256.5; 198/498; 425/225
[58] Field of Search ............ 425/225, 231, 226, 229; 99/427, 422; 15/256.5, 256.52, 236 C, 236 A, 236 NO, 104.04; 198/498

[56] References Cited
U.S. PATENT DOCUMENTS

| 2,101,751 | 12/1937 | Penny .................................. 198/498 |
| 2,231,135 | 2/1941 | Murray ......................... 15/256.52 X |
| 3,161,285 | 12/1964 | Hammer et al. ..................... 198/498 |
| 3,300,033 | 1/1967 | Ellis .................................. 198/498 X |
| 3,583,555 | 6/1971 | Karsnak et al. ...................... 198/498 |
| 3,625,181 | 12/1971 | Weaver ......................... 15/256.5 X |
| 3,680,474 | 8/1972 | Brown et al. ..................... 99/427 X |

Primary Examiner—Richard B. Lazarus  
Assistant Examiner—W. R. Briggs

[57] ABSTRACT

A rotating doctor blade. The blade is in the form of a cylinder and is of a hard plastic such as Teflon. It is concave at its periphery, the concave periphery contacting the convex surface of each of a series of molds. The molds are perforated and are mounted on an endless segmented belt.

3 Claims, 4 Drawing Figures

ROTATING DOCTOR BLADE

This invention relates to a rotating doctor blade assembly wherein the doctor blade elements are rotatable about a common axis for the purpose of scrapping or cleaning a food mold.

It has recently become practical to make certain food products, such as potato chips, of high quality and uniformity by the use of dehydrated potato granules mixed with water. Such mixture yields a paste, the paste being formed into a dough and suitably cut into endless strips and then fed through a fryer for cooking. The fryer contains at least one lower endless belt, the endless belt carrying a plurality of parallel lines or rows of individual molds. Depending upon the exact nature and style of the food product being made, an upper endless belt may also be employed although such an upper endless belt is not necessary for the practice of this invention. Each aligned row of mold elements includes a plurality of generally cylindrical and perforated molds upon which a dough prior to cooking is placed. After the cooking has been completed, the dough is removed from the molds and the molds which were on the upper run of the lower belt now return on the lower run of the belt to their initial positions for accepting new charges of dough. Unless some means is provided for scrapping or cleaning the convex portions of these molds, it has been observed that accumulations of the paste or dough take place with a resulting non-uniformity of the food product, under or overcooking of the food product or other undesired problems.

According to the practice of this invention, a rotating doctor blade or roll is provided on the underside of an endless segmented belt so that each rotating element thereof contacts the convex surface of a food mold after the food product which it carried through a bath of hot oil has been discharged from it and prior to the repetition of this action. The rotating doctor blade or roll is formed of Teflon or other relatively rigid plastic and is provided with a concave periphery. Additionally, the concave periphery carries a plurality of angularly spaced lands and valleys so that there is an intermittant or sequential scrapping or engagement between the lands of the doctor blades and the convex surface of the food mold.

Figure 1:
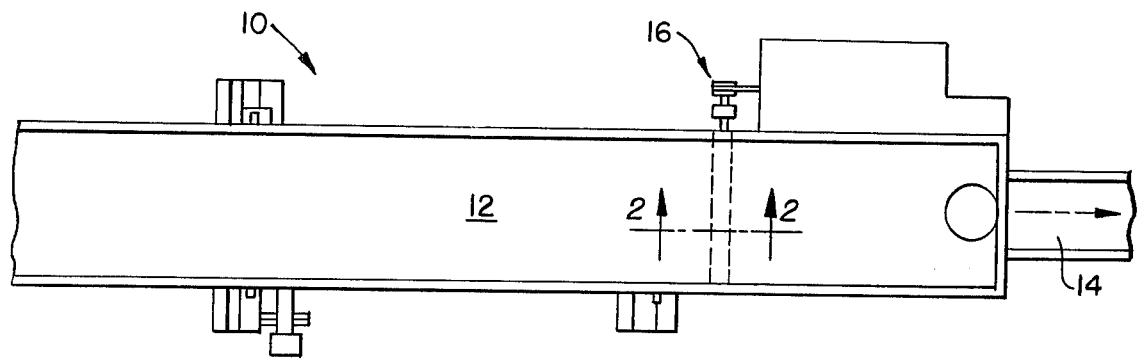
FIG. 1 is a partial schematic plan view of a portion of a potato chip or other food product making apparatus and illustrates the environment of the invention.

Referring now to the drawings, the numeral 10 indicates generally a portion of a cooker for a food product and includes an elongated housing 12 which contains a fryer. The fryer is provided with hot cooking oil, suitable pumps for recirculation of the oil and the like, the details of which are not important for the practice of this invention. The numeral 14 denotes generally a conveyor belt, the conveyor belt carrying cooked food products to one or more stations for packing or the like. The numeral 16 denotes generally a rotary drive for the rotating doctor blade assembly of the invention now to be described.

Figure 2:
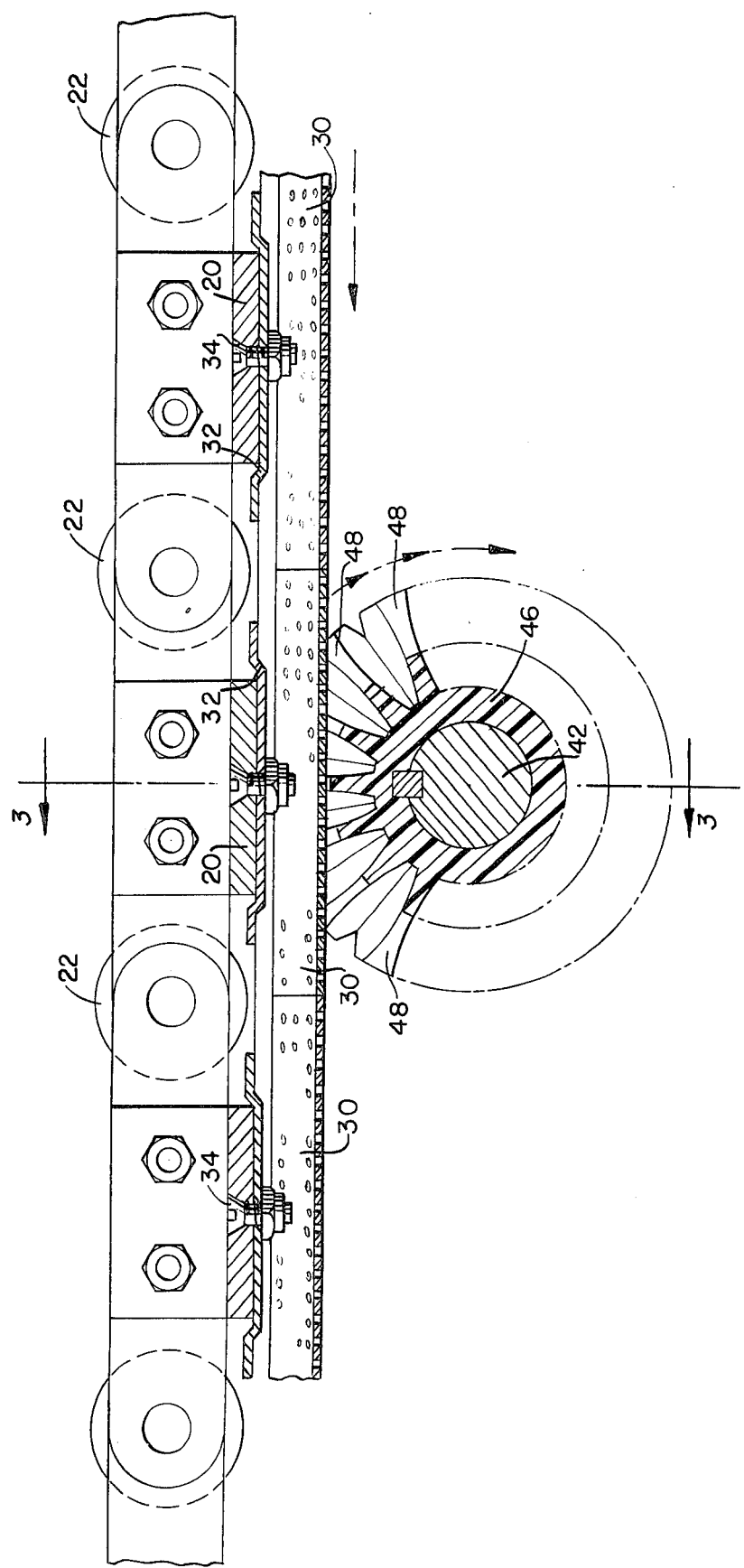
FIG. 2 is a view taken along sction 2-2 of FIG. 1.
Figure 3:
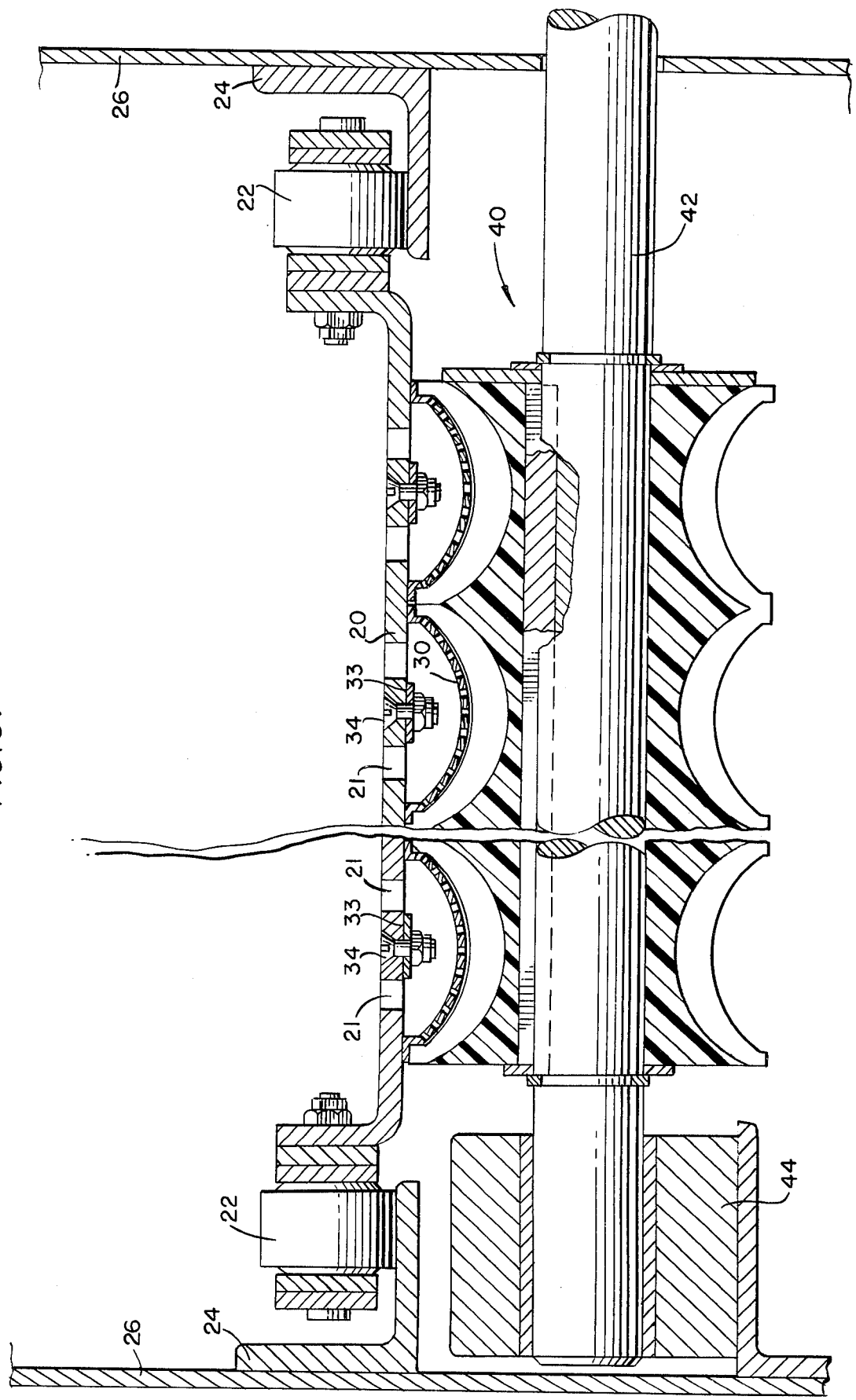
FIG. 3 is a view taken along section 3-3 of FIG. 2.

Referring now to FIG. 2 and 3 of the drawings, the numeral 20 denotes any one of a plurality of generally transverse bars having curved ends and carrying a plurality of through apertures 21. The curved ends of the bars are connected as by threaded fasteners to rotary bearings 22, the latter resting on and travelling along angle irons 24. The angle irons in turn are suitably fastened to the sides 26 of housing 12. The numeral 30 denotes any one of a plurality of aligned food molds which are perforated with through apertures. Each food mold 20 is in the general form of a part cylindrical segment with the axes of each of the segments (see FIG. 2) being aligned so as to form a single row or line of food molds. As shown in FIG. 3, a plurality of such aligned food molds are placed in side-by-side relationship, only three of which are illustrated. The numerals 32 and 33 indicate sheet metal strips which are attached to the longitudinal edges of the convex food molds 30, the strips being fastened to the spaced bars 20 by means of fasteners such as threaded fasteners 34. The elements 20-34 define portions of a segmented belt.

Figure 4:
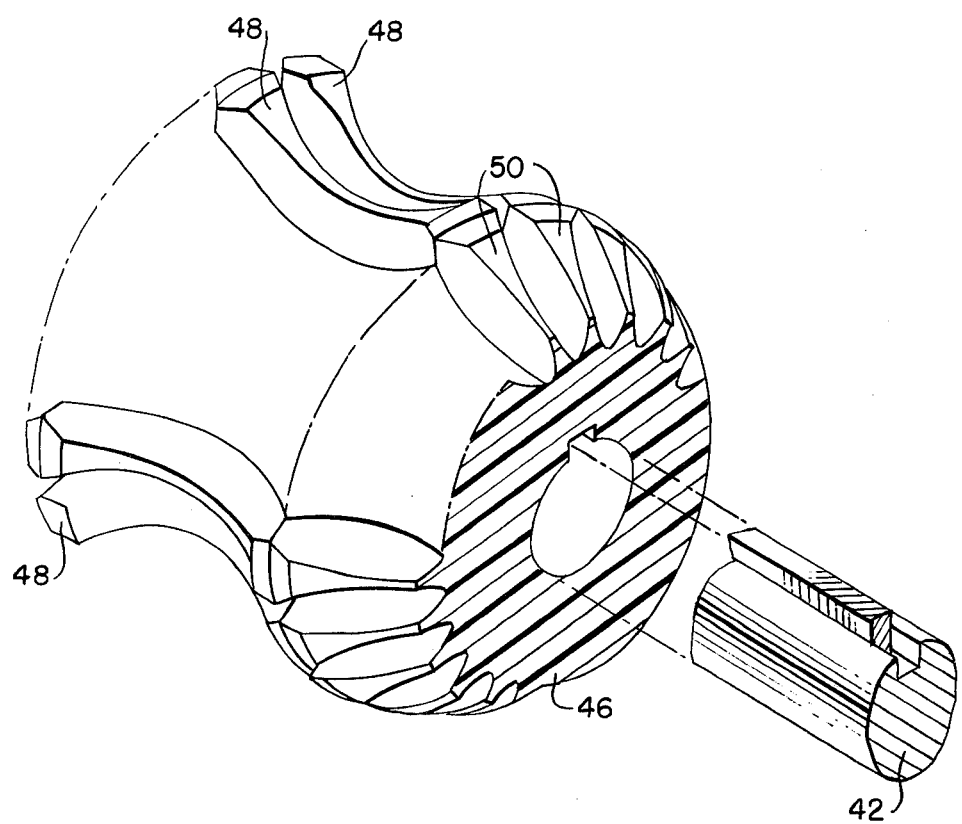
FIG. 4 is a perspective view of a typical rotating doctor blade or roll of this invention and a portion of a drive shaft upon which it is mounted for rotation therewith.

The numeral 40 indicates generally a rotating doctor blade or roll assembly that includes drive shaft 42 mounted at one end in bearing 44. Shaft 42 is turned by drive elements 16 shown at FIG. 1. Referring now to FIG. 4, each of the three illustrated doctor blades is denoted by the numeral 46 and is in the general form of a cylinder having a concave periphery. The numeral 48 indicates any one of a plurality of angularly spaced land portions on the periphery, the land portions separated by grooves. The land portions 50 are present on the ends of the rotating doctor blades because of the manner in which the lands 48 are formed. Namely, they are formed by milling. Each doctor blade includes a keyway for the key carried by shaft 42. In operation, the doctor blade rotates in such a direction as to contact and scrape, as shown in FIGS. 2 and 3, each of the convex food molds 30. The direction of rotation is such as to be counter to the direction of movement of the lower run of the segmented belt where contact is made between the food molds and the rotating doctor blades. Preferably, the curvature of the concave periphery of the doctor blades is complementary to the curvature of the food molds so that the molds are contacted over their outer surfaces. It has been observed that without such scraping, not all of the dough is removed from the molds as the dough leaves the cooker for transport on conveyor 14.

The rotating doctor blades carried by shaft 42 may be placed at any portion along the lower run of the endless segmented belt defined by parallel bars 20.

I claim:

1. A rotating doctor blade assembly for contacting and cleaning a mold for a food product, the assembly including:
   a. an endless and rotatable segmented belt having upper and lower runs;
   b. the belt carrying a plurality of aligned molds for a food product, ech mold being of part cylindrical configuration, the longitudinal axes of the molds being coaxial along the belt, and parallel to the longitudinal axis of belt, the convex portion of the molds facing upwardly on the upper belt run and downwardly on the lower belt run;
   c. a generally cylindrical doctor blade having a concave periphery, the doctor blade mounted for rotation about its longitudinal axis, with its longitudinal axis at right angles to the lower belt run and below it, the concave periphery of the doctor blade being of such size and extent to receive the complimentary sized convex surface of the mold, the doctor blade mounted in a position such that as it rotates it contacts and scrapes the convex surface of each mold as the endless segmented belt upon which the molds are mounted rotates.

2. The rotating doctor blade assembly of claim 1 wherein said doctor blade is provided at its concave periphery with angularly spaced and alternating lands and grooves, whereby the convex surface of each food mold is sequentially contacted by the doctor blade lands.

3. The rotating doctor blade assembly of claim 2 including a plurality of said rotating doctor blades keyed to a common rotatable drive shaft, each doctor blade periphery contacting a separate row of said aligned food molds.

* * * * *